United States Patent [19]

Ebert

[11] Patent Number: 5,330,624
[45] Date of Patent: Jul. 19, 1994

[54] FRACTIONATOR-REBOILER SLUDGE REMOVAL SYSTEM AND METHOD

[75] Inventor: John W. Ebert, Basehor, Kans.

[73] Assignee: Phillips Petroleum Company, Bartlesville, Okla.

[21] Appl. No.: 815,305

[22] Filed: Dec. 27, 1991

[51] Int. Cl.$^5$ .............................. B01D 3/26; B08B 3/02
[52] U.S. Cl. ......................................... 203/4; 203/47; 203/98; 203/DIG. 25; 122/405; 165/95; 196/122; 196/127; 202/153; 202/176; 202/241; 585/950
[58] Field of Search ..................... 203/4, 6-9, 203/, DIG. 25, 98, 39, 47; 202/241, 176, 153; 159/DIG. 13; 196/130, 131, 122, 127, 110, 123; 208/48 R, 48 Q, 48 AA; 122/405; 165/95; 585/950

[56] References Cited

U.S. PATENT DOCUMENTS

| 216,911 | 6/1879 | Titcomb | 122/405 |
|---|---|---|---|
| 235,216 | 6/1944 | Brown | 202/153 |
| 950,188 | 2/1910 | Parker | 122/405 |
| 2,504,710 | 4/1950 | Ludman et al. | 122/382 |
| 2,600,820 | 6/1952 | Whatley | 202/241 |
| 3,414,482 | 12/1968 | Folz | 203/2 |
| 3,425,935 | 2/1969 | Cahn | 208/348 |
| 3,483,092 | 12/1969 | Young | 203/4 |
| 3,641,190 | 2/1972 | Kivlen et al. | 134/39 |
| 3,766,021 | 10/1973 | Randall | 203/39 |
| 3,850,741 | 11/1974 | Callahan et al. | 134/39 |
| 4,079,701 | 3/1978 | Hickman | 122/382 |
| 4,566,406 | 1/1986 | Appleman | 122/405 |
| 4,577,677 | 3/1986 | Exzell | 165/1 |

OTHER PUBLICATIONS

R. Billet "Distillation Engineering", Chemical Publishing Co., 1979 p. 460.
M. P. Lieberman, "Troubleshooting Process Operations", 2nd Ed. Penwell Books, 1985, pp. 69-71.

Primary Examiner—Wilbur Bascomb, Jr.
Attorney, Agent, or Firm—George E. Bogatie

[57] ABSTRACT

Sludge is removed from a reboiler while the reboiler is supplying heat to a fractionator, by using sludge removal apparatus added to the reboiler. The reboiler to which the sludge removal apparatus is added comprises an evaporative type shell and tube heat exchanger in which sludge can accumulate as a residue from evaporated liquid, and further in which unevaporated liquid is withdrawn from the reboiler as a product. Sludge removal is accomplished by drawing a relatively small liquid flush stream from the reboiler liquid product stream, pressuring the flush stream through a pump, and then recycling the flush stream to a sparger appropriately disposed in the heat exchanger shell. Sludge dislodged by the sparger is removed along with the reboiler liquid product in a flow path along the bottom surface of the shell through cut-outs provided in the lower edge of the weir and baffle plates in the reboiler which without the cut-outs would block the flow path for the sludge.

10 Claims, 4 Drawing Sheets

FRACTIONATOR-REBOILER SLUDGE REMOVAL SYSTEM AND METHOD

This invention relates to distillation of hydrocarbon mixtures containing impurities in the form of solid particles. In one aspect it relates to apparatus for preventing fouling of a reboiler supplying heat to a fractionator. In another aspect it relates to an "on-line" method of removing sludge from the reboiler for a fractionator column.

BACKGROUND

The separation of mixtures into their components is one of the most important processes of the chemical industry. A common procedure for performing this separation is distillation, and numerous petroleum refining processes employ fractionator-reboiler apparatus for performing distillation of hydrocarbon mixtures.

In the most conventional distillation method, a hydrocarbon feed mixture is introduced into a fractionator column and the mixture is segregated in the column with the lower boiling constituent concentrating in a vapor phase as it migrates upwardly in the column, while the higher boiling constituent, in which any particulate material present tends to concentrate, flows downwardly in the column in a liquid state. A portion of the heavier particulate-containing liquid is withdrawn from the lower, or so called kettle, portion of the column, vaporized in a reboiler and returned to the kettle portion of the column to supply heat requirements of the distillation process.

The choice of reboiler apparatus will be dependent on the heat requirements of the distillation process. Generally, the reboiler comprises a shell and tube heat exchanger of the evaporative type which is employed for vaporization of the fractionator bottoms liquid and wherein the vaporization occurs in the shell of the reboiler.

A typical reboiler of this type comprises: a horizontally oriented shell having an inlet for process liquid and an outlet for vaporized process fluid; an inlet and an outlet for the heating medium which may be either steam or a hot process fluid; a plurality of tubes disposed in the shell so as to form a tube bundle; a tube sheet for supporting the tubes at one end, a dividing plate that cooperates with the tube sheet forming a heating fluid inlet header at one end of the tube bundle and a heating fluid outlet header at the other end of the tube bundle; transverse baffles for side-to-side flow of process liquid across the tubes; and a weir positioned within the shell to insure that liquid level in the shell is maintained and that tube surface is not exposed, with further provisions for removal of a portion of the process liquid supplied to the reboiler through a separate liquid outlet on the discharge side of the weir so that only a portion of the process liquid supplied to the reboiler is vaporized. The excess unvaporized liquid supplied to the reboiler is withdrawn from the reboiler as reboiler product. Typically, the evaporating type of reboiler also includes an empty volume of about 40% of the total shell volume located above the liquid level in the shell for disengagement of liquid-vapor mixture generated in the reboiler.

If the fractionator bottoms malaria 1 is a contaminated liquid containing solid particles or sludge, which is often the case, the area on the inner surface of the shell below the tube bundle can become virtually plugged with accumulations of these solids. Unless these accumulations are promptly removed, corrosion and fouling of the reboiler can occur.

Accordingly, it is an object of this invention to reduce the accumulation of solid particles which cause fouling of a reboiler supplying heat for a distillation process.

It is another object of this invention to maintain efficiency and capacity of a reboiler by the continuous or intermittent sparging and flushing of solid or semisolid accumulations from the shell of a shell and tube reboiler.

It is a further object of this invention to flush out accumulations of deposits while the evaporative type reboiler is in service for supplying heat to a fractionator column.

SUMMARY OF THE INVENTION

In accordance with one aspect of this invention, there is provided apparatus for on-stream cleaning of a shell and tube evaporative type reboiler which includes a transversly disposed weir plate and one or more transversly disposed baffle plates, and where both the weir and baffle plates are of the same general shape as a cross section of the shell. The cleaning apparatus, partly mounted in the shell, is provided for flushing sludge from the lower surface of the shell. The specific sludge removal apparatus within the shell includes: (1) a sparger comprising a length of perforated pipe which is positioned directly below the tube bundle in the lower part of a generally horizontally mounted shell and (2) a weir plate and baffle plates having cut-outs in the lower edge to permit passing of sludge along the bottom of the shell.

Outside the reboiler shell there is provided a circulating pump along with appropriate conduit for recycling a portion of the process liquid from the reboiler to the sparger. Further there is preferably provided a separator vessel for solids and liquids, which is positioned in the recycle conduit, to prevent withdrawn sludge from being returned to the shell.

In another aspect of this invention, a method for the removal of solid particles or sludge from time shell comprises flushing the sludge from the shell along with a flow of reboiler product liquid. A small portion of reboiler product liquid withdrawn from the shell is pressurized and recycled to impinge on the sludge so as to dislodge any accumulated sludge from the lower surface of the shell and to direct the flow of a mixture of dislodged sludge and process liquid through special cut-outs in the weir and baffle plates and toward a reboiler product liquid outlet on the shell. In this manner the sludge is removed from the shell with the unvaporized process liquid which is the reboiler product. In a preferred embodiment, separation of the sludge from the process liquid is accomplished in a settler type separator provided outside the reboiler for that purpose.

Other objects and advantages of the invention will be apparent from the foregoing brief description of the invention and the claims, as well as the following detailed description of the preferred embodiment of the invention as illustrated by the drawings in which:

DETAILED DESCRIPTION OF THE INVENTION

Figure 1:
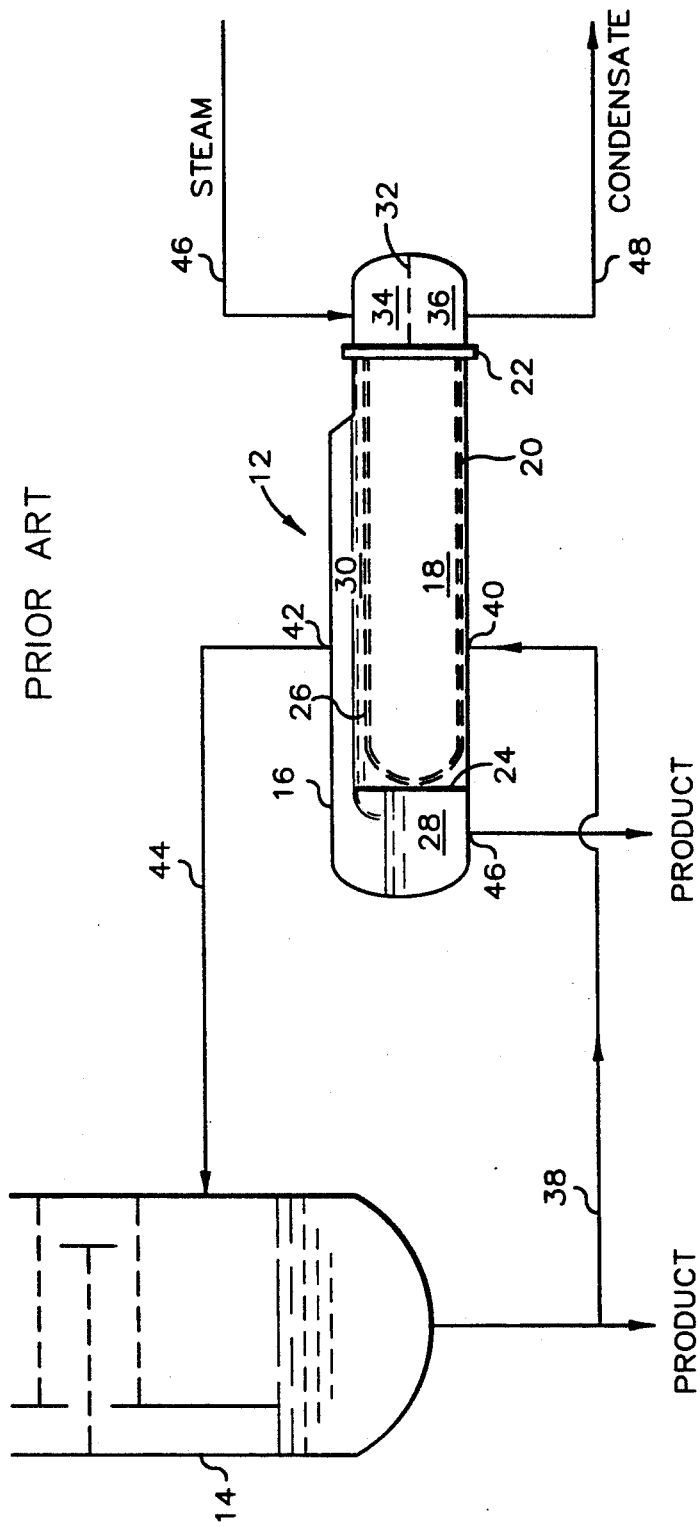
FIG. 1 is schematic diagram illustrating a prior art evaporative type reboiler connected to a fractionator.

The instant invention is directed to improving distillation of hydrocarbon mixtures where fractionator-reboiler apparatus is employed, and is particularly applicable to distillation of feed material containing solid particles which tend to concentrate in the bottoms liquid of a fractionator, and which further tend to deposit and accumulate in an evaporative type reboiler supplying heat to the kettle portion of the fractionator.

It will be appreciated by those skilled in the art that since all of the FIGS. are schematic only, many items of equipment which would be needed for successful operation of a commercial distillation process have been omitted for the sake of clarity. Such items of equipment would include, for example, temperature, flow and pressure measurement instruments and corresponding process controller, pumps, valves , etc. All of these items would be provided in accordance with standard chemical engineering practice to maintain desired conditions throughout the process and are not necessary to describe the present invention. It should also be understood that any representative temperatures and pressures set forth herein with relation to the description of the drawing and the example, are illustrative only and are not be be considered as limiting the invention. The particular temperatures, flows and pressures utilized in any particular separation will be dependent upon the nature and composition of the feed stream, the apparatus available for making the separation, and upon the initial temperatures and pressure of the feed stream.

Referring now to FIG. 1, there is illustrated the connection of an evaporative type reboiler, generally indicated at 12, to a fractionator column 14 as is known in the prior art. The reboiler 12 includes a shell 16, a boiling zone 18 containing a tube bundle 20 for interiorly passing a heating medium. The bundle 20 is supported at one end by a stationary tube sheet 22. Additional support members for the tube bundle, not illustrated in FIG. 1, can be employed if desired. A dividing plate 32 cooperates with the tube sheet 22 to form a heating fluid inlet header 34 at the upper end of the tube bundle 20, and an outlet header 36 at the lower end of the tube bundle 20. Further referring to the reboiler 12 in FIG. 1, a weir 24 is positioned in the shell in a manner to maintain a liquid level 26 in the reboiler which will insure that the tube bundle 20 is not exposed, and to divide the shell into a boiling zone 18 and a discharge zone 28. The vacant space above the tube bundle 20 is a liquid-vapor disengaging zone 30.

For supplying heat required in fractionator column 14, bottoms liquid is withdrawn from the bottom of fractionator 14 via conduit 38 and passed to the boiling zone 18 through a liquid inlet 40 on the underside of the shell 16. The bottoms liquid is vaporized by heat supplied to the reboiler 12 and reboiled vapor is withdrawn from the reboiler 12 through the vapor outlet 42. The thus withdrawn vapor is returned to the lower portion of the fractionator 14 via conduit 44. Heat is supplied to the reboiler 12 by a heating medium, usually steam, supplied via conduit 46, and steam condensate is withdrawn via conduit 48. Since it is desired that only about 80% of the fractionator liquid bottoms entering at liquid inlet 40 is vaporized, provisions are made for removal of the excess fractionator bottoms liquid supplied to the reboiler. This excess liquid is removed from the discharge side 28 of the weir 24 through liquid outlet 46 as a reboiler product liquid.

The reboiler 12 and its connection to a fractionator described thus far with reference to FIG. 1, are conventional. It is the apparatus and manner of removing sludge deposits from time reboiler shell that provide the novel features of the present invention.

Figure 2:
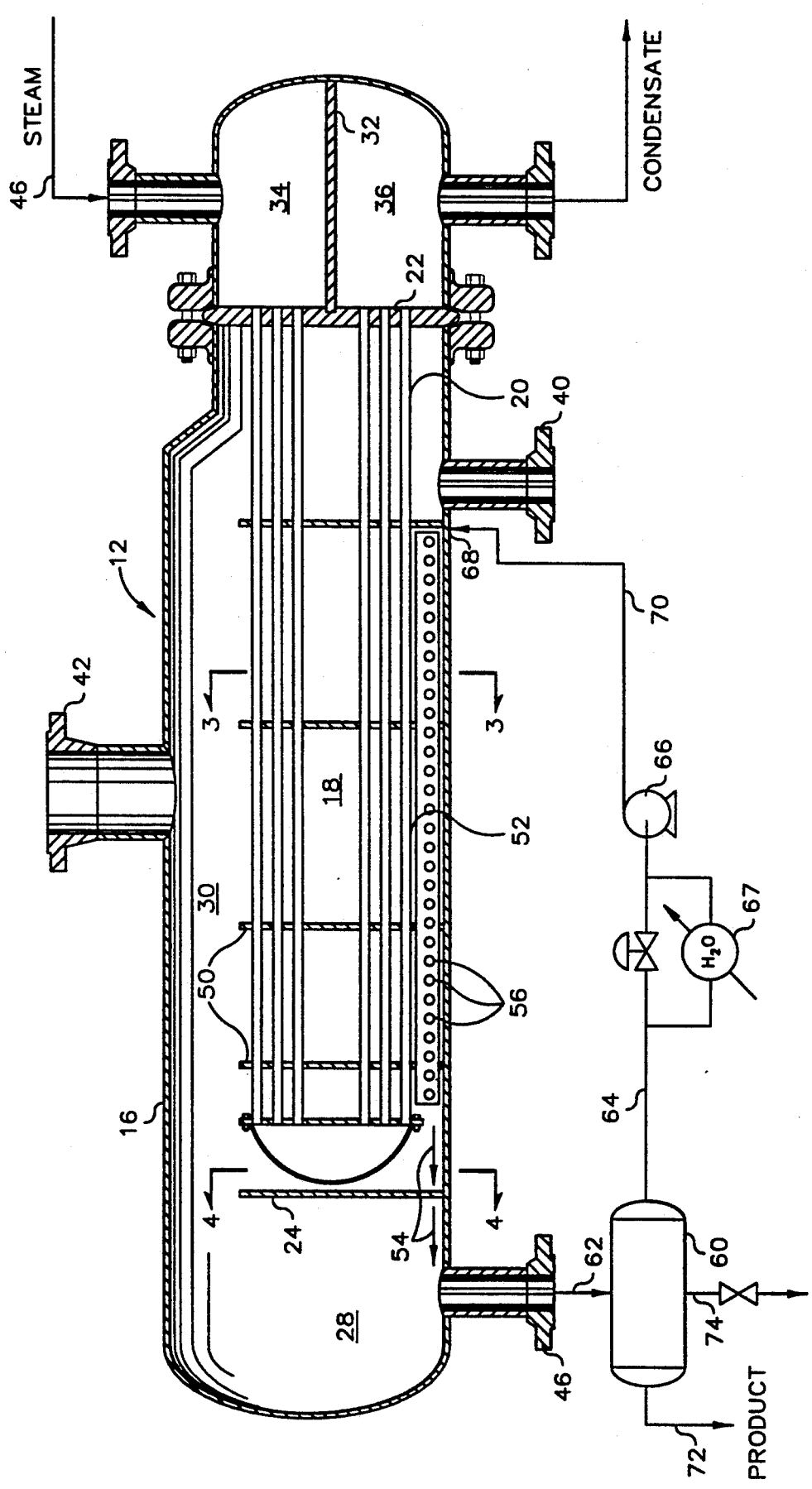
FIG. 2 is a schematic diagram illustrating an evaporative type reboiler having a sparger and means for recycling reboiler product liquid according to the present invention.

Referring now to FIG. 2, there is illustrated a reboiler 12 showing greater detail compared to FIG. 1, and further including on-stream cleaning apparatus for sludge removal according to the invention. The reboiler illustrated in FIG. 2, however, includes many parts which are identical or equivalent to those illustrated in FIG. 1, and further the reboiler of FIG. 2 would be connected to a fractionator and generally operated in the same manner as the reboiler illustrated in FIG. 1. Accordingly, the same referenced numerals are used for the same or equivalent parts illustrated throughout FIGS. 1-4, and connection of the reboiler 12 to the fractionator 14 will not be described with reference to FIG. 2.

Positioned in the bottom of the shell 16, as shown in FIG. 2, is a sparger 52 comprising a length of perforated pipe wherein a plurality of nozzles 56 open through perforations in the pipe at spaced intervals along the pipe 52 for the introduction of recycled process liquid to impinge on the lower inner surface of the shell 16. The nozzles 56, which may be any suitable nozzle fixed on the sparger 52, point generally downwardly but at a slight angle from the vertical so as to direct time nozzle discharge flow through submerged openings in the lower edge of the weir 24 and into the reboiler product liquid outlet 46. The nozzles 56 illustrate only a portion of the nozzles which would be provided in a commercial unit. The sparger 52 may be mounted in the shell in any suitable manner so as to direct flow of pressurized liquid against the bottom surface inside the shell 16 to dislodge accumulations of solid or semisolid material, which is commonly referred to as sludge. The liquid flow within the shell 16 is influenced by the nozzle discharge to carry the dislodged sludge toward the liquid out let 46 as indicated by the arrows 54, where the sludge is removed in admixture with the reboiler product liquid through outlet 46.

Further illustrated in FIG. 2 are transverse baffles or support plates 50 which further support the tube bundle 20, and which cause side-to-side liquid flow through the shell so as to traverse the tubes 20. In accordance with this invention, a baffle 50, which is also illustrated in FIG. 3, is provided which accommodates installation of the sparger 52 and further accommodates passage of the dislodged sludge along the bottom of the shell 16 by including a cut-out 76 in the lower edge of the baffle through which the sparger pipe 52 passes, and through which sludge dislodged near the fluid entry end of sparger 52 can also pass.

Still referring to FIG. 2, an admixture of sludge and reboiler product liquid is withdrawn through liquid outlet 46 and in a preferred embodiment is passed to a separator vessel 60 via conduit 62. The separator 60 may be any suitable separator such as a settler vessel in which separation of a liquid from its impurities can be effected by settling. From separator 60 a liquid flush stream of reboiler product is withdrawn through conduit 64, cooled by exchanger or water cooler 67 to reduce the temperature sufficiently to meet pump requirements for net positive suction head, pressurized by recirculation pump 66 and then provided to an entry end 68 of sparger 52 through conduit 70. The flush stream may be continuous or intermittent. Excess process liquid supplied to reboiler 12 through liquid inlet 40 is passed to separator 60 and withdrawn through conduit 72 for utilization in any desired manner. Also a sludge containing material can be withdrawn from separator 60 via conduit 74 for disposal in any suitable manner.

The reboiler product liquid supplied to the entry end 68 of sparger 52 is discharged through the nozzles 56 fixed on sparger 52 with sufficient velocity to dislodge sludge from the bottom shell 16 so that the sludge in admixture with the reboiler product liquid is removed from the shell by passing along the bottom of the shell through indentations in the baffles 50 and the weir 24, as illustrated by the arrows 54 in FIG. 2.

Figure 3:
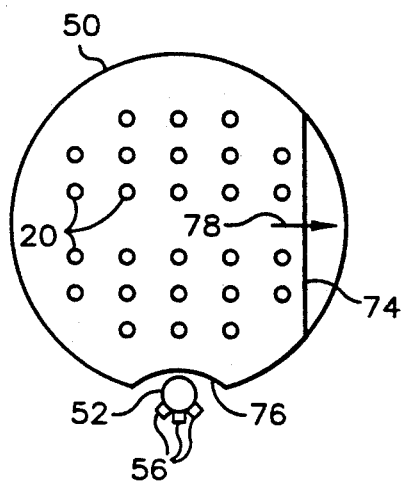
FIG. 3 is a cross-sectional view taken along the lines 3—3 of FIG. 2 showing baffle plate indentations according to the present invention.

A more detailed illustration of the baffle 50 is provided in FIG. 3, which is a view taken along the lines 3—3 of FIG. 2. Referring now to FIG. 3, the baffle 50, tube holes 20, nozzles 56 and the sparger 52 shown in FIG. 2 are also shown in FIG. 3. Further illustrated in FIG. 3 is the preferred shape of the baffle 50 which deviates from a circular shape by having a cut along a vertical edge 74 and further having a semicircular cut out 76 along the bottom edge of the baffle 50. The arrow 78 generally indicates the direction of side-to-side flow of the bulk of the process fluid through the shell which is caused by the baffle 50.

Figure 4:
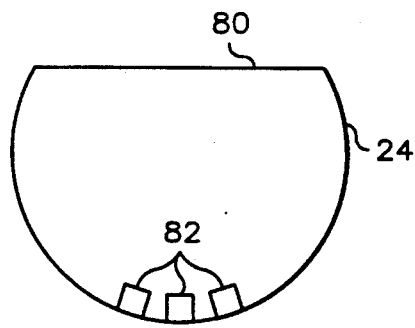
FIG. 4 is a cross-sectional view taken along the lines 4—4 of FIG. 2 showing indentations in the weir according to the present invention.
Figure 5:
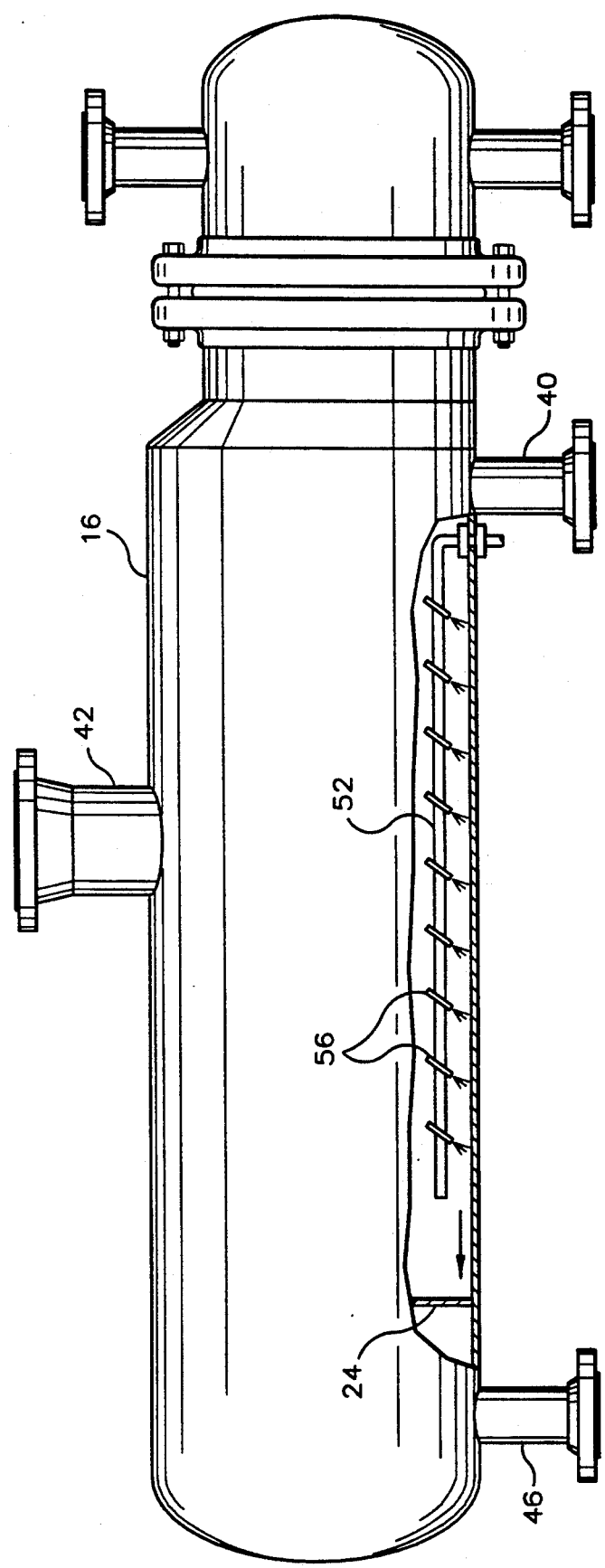
FIG. 5 is a schematic diagram illustrating orientation of nozzles attached to the sparger shown in FIG. 2.

A more detailed illustration of the weir 24 is provided in FIG. 4, which is a view taken along the lines 4—4 of FIG. 2. Referring now to FIG. 4, the preferred shape of the weir 24 deviates from a circular shape by having a cut along the horizontal edge 80, and further having rectangular or semicircular cut outs 82 in the bottom edge of the weir.

CALCULATED EXAMPLE

The following Table I is presented to further illustrate the present invention through assuming some typical initial compositions and conditions for a fractionator-reboiler apparatus, which is employed as a dubutanizer tower, and which could advantageously employ the sludge removal system of the present invention. In sections A and B of Table I, the composition make-up, flow rate and temperature of the feed stream to the reboiler 16 is illustrated. The following sections of Table I present calculated material and energy data pertinent to the design of the sludge removal system. The reference numerals included in Table I refer to the numerals illustrated in the drawing figures.

TABLE I

Reboiler Sludge Removal Illustration For a Debutanizer Tower

A. Bottoms Liquid Composition:
| | | |
|---|---|---|
| $C_4$ | 0.5 | LV % |
| $C_5$ | 9.8 | LV % |
| Residue | 89.7 | LV % |
| Sp. Gravity | 0.73 | |
| V.P. @ 100° F. | 7.1 psia | |

TABLE I-continued

Reboiler Sludge Removal Illustration For a Debutanizer Tower

B. Fractionator bottoms liquid charged to reboiler shell 16:
| | |
|---|---|
| Flow Rate Rate | 502 B/H |
| Temp | 302° F. |
| Pressure | 149 psig |

C. Steam Charged to Reboiler Tubes 20:
| | |
|---|---|
| Flow Rate | 25,000 LB/HR |
| Pressure | 400 psig |
| Temperature | 450° F. |
| Heat Supplied | $28.6 \times 10^6$ BTU/HR |

D. Vaporized Bottoms Liquid Charged to Fractionator 14:
| | |
|---|---|
| Flow Rate | 815 B/H |
| Pressure | 149.5 psia |
| Temperature | 330° F. |

E. Flush Stream 66, 70, 68
| | |
|---|---|
| Flow Rate | 20 B/H |
| Pressure | 250 psig |
| Temperature | 150° F. |

F. Baffle Cut-out, 76
Sized for 4% of flow bypassing tube bundle.

G. Submerged cutouts on weir, 82
2"-3" wide, 2"-3" deep

While the present invention has been described in terms of the presently preferred embodiments, reasonable variations and modifications are possible by those skilled in the art, which are within the scope of the described invention and the appended claims.

That which is claimed is:

1. An evaporative type reboiler having a sludge removal system for use with a fractional distillation column, said reboiler comprising:

an elongated heat exchanger shell for use in a generally horizontal position and having an inlet near a first end of said shell for a process liquid product comprising a particulate containing liquid withdrawn from the lower portion of said fractional distillation column, said shell also having an outlet near a second end for a reboiler liquid product;

an elongated heat exchanger tube bundle disposed in said shell for interiorly passing a heating medium;

a sparger pipe disposed in said shell below said tube bundle, wherein said sparger pipe employs said process liquid product for dislodging sludge from the inner bottom surface of said shell;

at least one baffle plate for said tube bundle of the same general shape as the cross section of said shell and transversely disposed in said shell across said tube bundle, said baffle plate having a lower edge with a cut-out for avoiding contact with said sparger pipe and allowing passage of sludge therethrough;

a weir plate of the same general shape as the cross section of said shell and disposed transversely in said shell between said reboiler liquid product outlet and said tube bundle, said weir plate having a lower edge with a cut-out for passing sludge therethrough; and means for removing dislodged sludge from said shell.

2. Apparatus in accordance with claim 1, additionally comprising:

a fractional distillation column; and means for connecting said evaporative type reboiler having said sludge removal system to said fractional distillation column.

3. Apparatus in accordance with claim 1, wherein said sparger pipe comprises a perforated pipe and said means for removing dislodged sludge comprises:

a recycle conduit connecting said reboiler liquid product outlet to an inlet of said sparger pipe for supplying at least a portion of said reboiler liquid product to said sparger pipe;

a recycle pump operably disposed in said recycle conduit for delivering pressurized liquid to said sparger pipe; and a plurality of nozzles which open through perforations in said sparger pipe at spaced intervals, said nozzles pointing generally downwardly and at an angle from the vertical for discharging liquid to impinge on said shell in a direction toward said reboiler liquid product outlet so as to urge said dislodged sludge to said reboiler product outlet for removal.

4. Apparatus in accordance with claim 3, additionally comprising:

a separator vessel for separating said reboiler liquid product and sludge, wherein said separator vessel is connected in said recycle conduit between said reboiler liquid product outlet and said recycle pump.

5. Apparatus in accordance with claim 4 additionally comprising a cooler disposed in said recycle conduit, wherein said cooler is connected between said separator vessel and said recycle pump for reducing the temperature of recycle liquid sufficiently to meet net positive suction head requirements for said pump.

6. A method of removing sludge from a reboiler supplying heat to a fractional distillation column, said reboiler comprising a horizontally positioned shell and tube heat exchanger of the evaporative type, and having a weir plate and at least one baffle plate of the same general shape as a cross section of said shell, said weir plate and said baffle late being traversely disposed in said shell and each having a cut-out in a lower edge, said method comprising the following steps:

withdrawing a process liquid product stream from said fractional distillation column and passing at least a portion of said process liquid product stream as a feed stream to said reboiler;

vaporizing a portion of said reboiler feed stream in said reboiler and withdrawing unvaporized liquid from said reboiler as a reboiler liquid product;

passing a pressurized liquid flush stream along an inner bottom surface of said shell;

dislodging accumulations of sludge in said shell with said liquid flush to form a mixture comprising sludge and reboiler liquid product; and removing sludge from said reboiler by flowing said mixture of sludge and reboiler liquid product through said cut-outs in said lower edge of said weir plate and said baffle plate to a reboiler outlet.

7. A method in accordance with claim 6, wherein said shell contains a sparger comprising a perforated pipe disposed below a tube bundle in said shell and tube heat exchanger and wherein said step of passing a pressurized liquid flush stream comprises:

drawing a liquid flush stream from said reboiler liquid product with a pump; and passing the effluent from said pump to an inlet of said sparger.

8. A method in accordance with claim 7, wherein said sparger includes a plurality of fixed nozzles which open through perforations in said sparger, said nozzles pointing generally downwardly and at an angle from the vertical towards said weir and wherein said step of dislodging sludge accumulations comprises:

discharging said flush stream through said plurality of nozzles on said sparger.

9. A method in accordance with claim 8, wherein said reboiler liquid product is discharged through a liquid outlet in said shell, said method additionally comprising the following step:

discharging said mixture of sludge and reboiler liquid product through said reboiler liquid outlet.

10. A method in accordance with claim 9, wherein a separator vessel is disposed for receiving said mixture, said method additionally comprising the following steps:

separating sludge and reboiler liquid product in a separator vessel; and drawing said liquid flush stream from said separator vessel.

* * * * *